United States Patent
Meyer et al.

(10) Patent No.: US 8,598,501 B2
(45) Date of Patent: Dec. 3, 2013

(54) GPS INDEPENDENT GUIDANCE SENSOR SYSTEM FOR GUN-LAUNCHED PROJECTILES

(75) Inventors: A. Douglas Meyer, Woodland Hills, CA (US); Mostafa A. Karam, Moorpark, CA (US); Charles A. Lee, Camarillo, CA (US); Charles H. Volk, Newbury Park, CA (US)

(73) Assignee: Northrop Grumman Guidance an Electronics Co., Inc., Woodland Hills, CA (US)

( * ) Notice: Subject to any disclaimer, the term of this patent is extended or adjusted under 35 U.S.C. 154(b) by 109 days.

(21) Appl. No.: 13/135,268

(22) Filed: Jun. 30, 2011

(65) Prior Publication Data

US 2013/0001354 A1  Jan. 3, 2013

(51) Int. Cl.
*F41G 7/00* (2006.01)
*F42B 15/01* (2006.01)
*F42B 15/00* (2006.01)

(52) U.S. Cl.
USPC ......... 244/3.19; 244/3.1; 244/3.11; 244/3.14; 244/3.15; 342/59; 342/61; 342/62; 342/104; 342/118; 342/125; 342/175; 342/188; 342/195

(58) Field of Classification Search
USPC .............. 244/3.1–3.19; 342/61–68, 175, 188, 342/195, 104–115, 118, 125, 146, 147, 342/42–51, 59, 149–154; 89/1.11
See application file for complete search history.

(56) References Cited

U.S. PATENT DOCUMENTS

| | | | | |
|---|---|---|---|---|
| 2,998,941 A * | 9/1961 | Wilkes | ........................ | 342/188 |
| 3,958,241 A * | 5/1976 | Adrian | ........................ | 342/188 |
| 4,750,689 A * | 6/1988 | Yf | ........................ | 244/3.14 |
| 4,967,981 A * | 11/1990 | Yff | ........................ | 244/3.14 |
| 4,979,696 A * | 12/1990 | Yff | ........................ | 244/3.14 |
| 5,039,029 A * | 8/1991 | Taylor et al. | ........................ | 244/3.11 |
| 5,099,246 A * | 3/1992 | Skagerlund | ........................ | 244/3.14 |
| 5,163,637 A * | 11/1992 | Hansen | ........................ | 244/3.14 |
| 5,344,099 A * | 9/1994 | Pittman et al. | ........................ | 244/3.13 |
| 5,414,430 A * | 5/1995 | Hansen | ........................ | 342/188 |
| 6,016,990 A * | 1/2000 | Small | ........................ | 244/3.11 |
| 6,483,455 B2 * | 11/2002 | Fleury et al. | ........................ | 342/62 |
| 6,572,052 B1 * | 6/2003 | Hansen | ........................ | 244/3.11 |
| 6,724,341 B1 * | 4/2004 | Pereira et al. | ........................ | 342/62 |
| 7,023,380 B2 * | 4/2006 | Schneider | ........................ | 244/3.14 |
| 7,193,556 B1 * | 3/2007 | Pereira et al. | ........................ | 342/62 |
| 7,589,663 B1 * | 9/2009 | Goldman et al. | ........................ | 342/62 |
| 7,977,613 B2 * | 7/2011 | Rastegar et al. | ........................ | 244/3.1 |
| 7,999,212 B1 * | 8/2011 | Thiesen et al. | ........................ | 244/3.14 |
| 8,258,999 B2 * | 9/2012 | Rastegar et al. | ........................ | 342/62 |

FOREIGN PATENT DOCUMENTS

FR  2436433 A1 *  4/1980  .............. G05D 1/08

* cited by examiner

*Primary Examiner* — Bernarr Gregory
(74) *Attorney, Agent, or Firm* — John H. Lynn; Lynn & Lynn

(57) ABSTRACT

A sensor system uses ground emitters to illuminate a projectile in flight with a polarized RF beam. By monitoring the polarization modulation of RF signals received from antenna elements mounted on the projectile, both angular orientation and angular rate signals can be derived and used in the inertial solution in place of the gyroscope. Depending on the spacing and positional accuracies of the RF ground emitters, position information of the projectile may also be derived, which eliminates the need for accelerometers. When RF signals of ground emitter/s are blocked from the guided projectile, the sensor deploys another plurality of RF antennas mounted on the projectile nose to determine position and velocity vectors and orientation of incoming targets.

14 Claims, 6 Drawing Sheets

GPS INDEPENDENT GUIDANCE SENSOR SYSTEM FOR GUN-LAUNCHED PROJECTILES

BACKGROUND OF THE INVENTION

This invention relates generally to a guidance system for a projectile launched by firing the projectile from a gun. This invention relates particularly to a sensor system for measuring position and velocity vectors and orientation of a guided gun-launched projectile.

During launch, gun-fired munitions are subjected to extremely high setback accelerations. Here, the term "gun-fired munitions" is also intended to include mortar shells. A gun-fired munition receives all of its kinetic energy during its launch phase. Peak launch accelerations occur during the first 3 to 4 milliseconds from initial movement of the projectile, at which time a projectile has typically moved only a few feet. Shortly after gun barrel exit, the projectile has stopped accelerating and experiences a set-forward acceleration typically about ten percent of the peak set-back acceleration level. Once the round has exited the barrel, no more energy is available to the round during the remainder of the flight, except that for guidance and control actions and when boosters are used to extend the range of the round.

The prior art uses accelerometers and gyroscopes to determine the position and orientation of the round during the flight for guidance and control purposes to ensure precision target acquisition. In the gun-fired munitions applications, these inertia-based accelerometers and gyroscopes are required to withstand extreme harsh launch environments (up to 120,000 g acceleration), yet be sensitive enough to yield the required position and orientation precision up to the target area.

There are two primary challenges with inertial devices currently used as guidance sensors in gun fired munitions for closed loop feedback control. The first challenge of current inertial technologies is gun survivability of devices that have the needed sensitivity for flight measurements. Prior inertial devices are not able to survive when the full-scale dynamic range exceeds 5% of the maximum force experienced during the launch. For guidance applications in gun fired munitions, it is required that the full scale dynamic range during flight be in the order of 0.2% of the maximum force experienced during launch. This challenge is very specific to the environment of a gun-fired munition. The second challenge devices constructed using prior inertial technologies have long settling times that are on the order of a few milliseconds. These limitations of the prior art inertial technologies significantly affect their use as guidance sensors for gun fired munitions.

Precise end game targeting also requires extremely fast activation of the inertia sensor after the initial setback. At an approximate exit velocity of 3000 m/s it is necessary to ensure that the inertia sensors react extremely quickly to avoid badly missing a target. Less than one quarter of a millisecond settling time would significantly advance current inertia sensors for gun fired munition systems—an improvement of more than an order of magnitude that would improve target acquisition by a similar amount.

SUMMARY OF THE INVENTION

The present invention provides means for overcoming the above two challenges and for increasing the sensor sensitivity, even if these devices need to survive extreme harsh environments such as those found during the launch of gun-fired munitions.

The present invention eliminates the prior art requirement for gyroscopes and GPS devices by illuminating the projectile in flight with a polarized RF beam. By monitoring the polarization modulation of RF signals received from antenna elements mounted on the projectile, both angular orientation and angular rate signals can be derived and used in the inertial solution in place of the gyroscope. Depending on the spacing and positional accuracies of the RF ground emitters, position information of the projectile may also be derived, which eliminates the need for accelerometers.

DETAILED DESCRIPTION OF THE INVENTION

Figure 1:
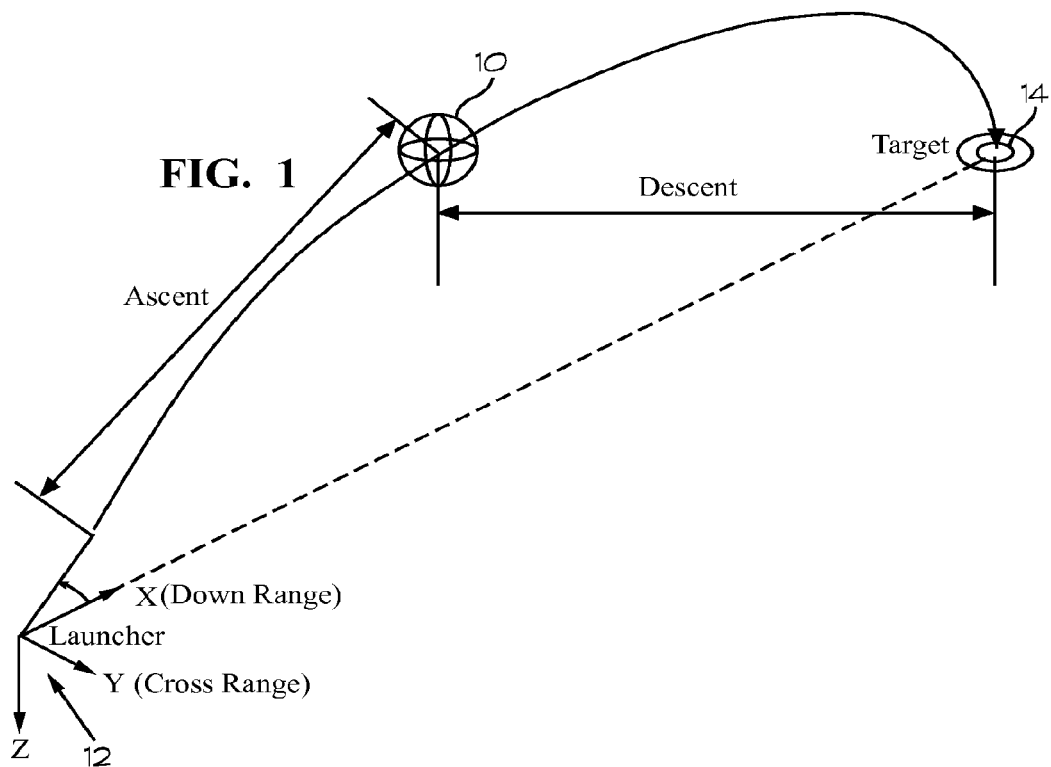
FIG. 1 shows an example of a flight profile for a projectile after being fired from a launcher toward a target.

FIG. 1 shows an example of a flight profile for a projectile 10 after being fired from a launcher 12 toward a target 14. The word "projectile" is also used in this disclosure to represent a guided munition. The word "target" is also used to represent an incoming munition. A typical range of about 50 Km is assumed. Immediately after being launched the projectile 10 is in an ascent phase (phase 1) wherein guidance is accomplished using RF triangulation and polarization sensing. After reaching a maximum height, the projectile 10 enters a descent phase (phase 2) wherein projectile guidance is accomplished using sensed inertial acceleration and RF polarization sensing. The descent velocity is typically about 350 m/s for descent duration of about 100 sec. It should be noted that the projectile 10 contains no gyroscopic rotation sensors.

Figure 2A:
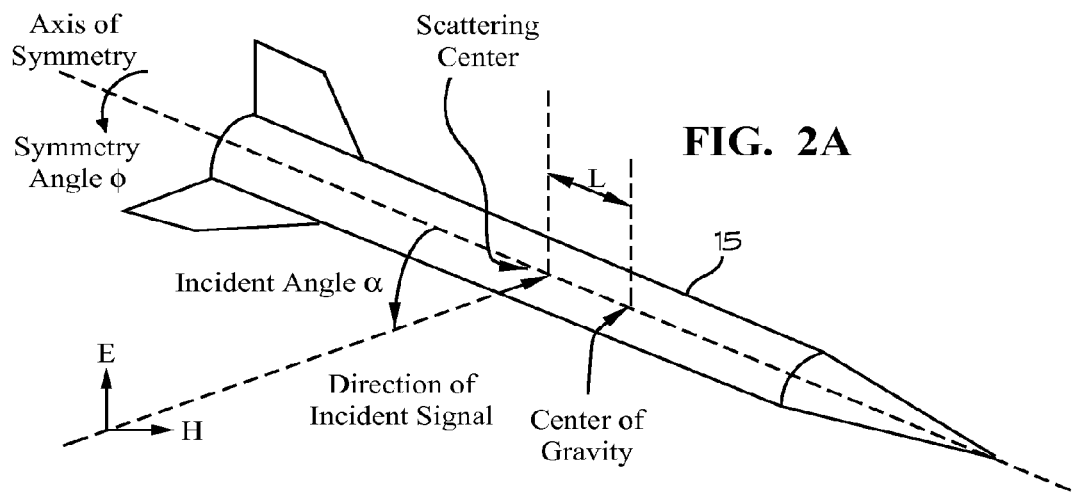
FIG. 2A is a perspective view of an incoming munition which represents a typical target.

An incoming munition 15 has an axis of symmetry (FIG. 2A). Its backscattered signals are independent on the symmetry angle $\phi$ and depend only on the incident angle $\alpha$. This facilitates inferring the relationship relating the incident angle $\alpha$ and the backscattered polarized signals (direct scattering) and hence extracting values of the incident angle from the backscattered signals (inverse scattering). Fortunately, values of the incident angle $\alpha$ determine the orientation of the incoming munition 15 (target) relative to the guided munition (source).

Figure 2B:
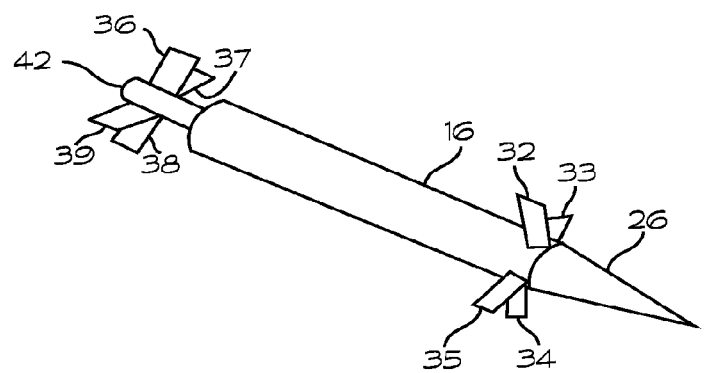
FIG. 2B is a perspective view of a guided projectile/munition.

FIG. 2b shows a guided projectile 16 that typically has an elongated shape. The projectile 16 may have a plurality of canards 32-35 attached thereto near a nose 26 and may have a plurality of fins 36-39 attached near a tail section 42.

Figure 3:
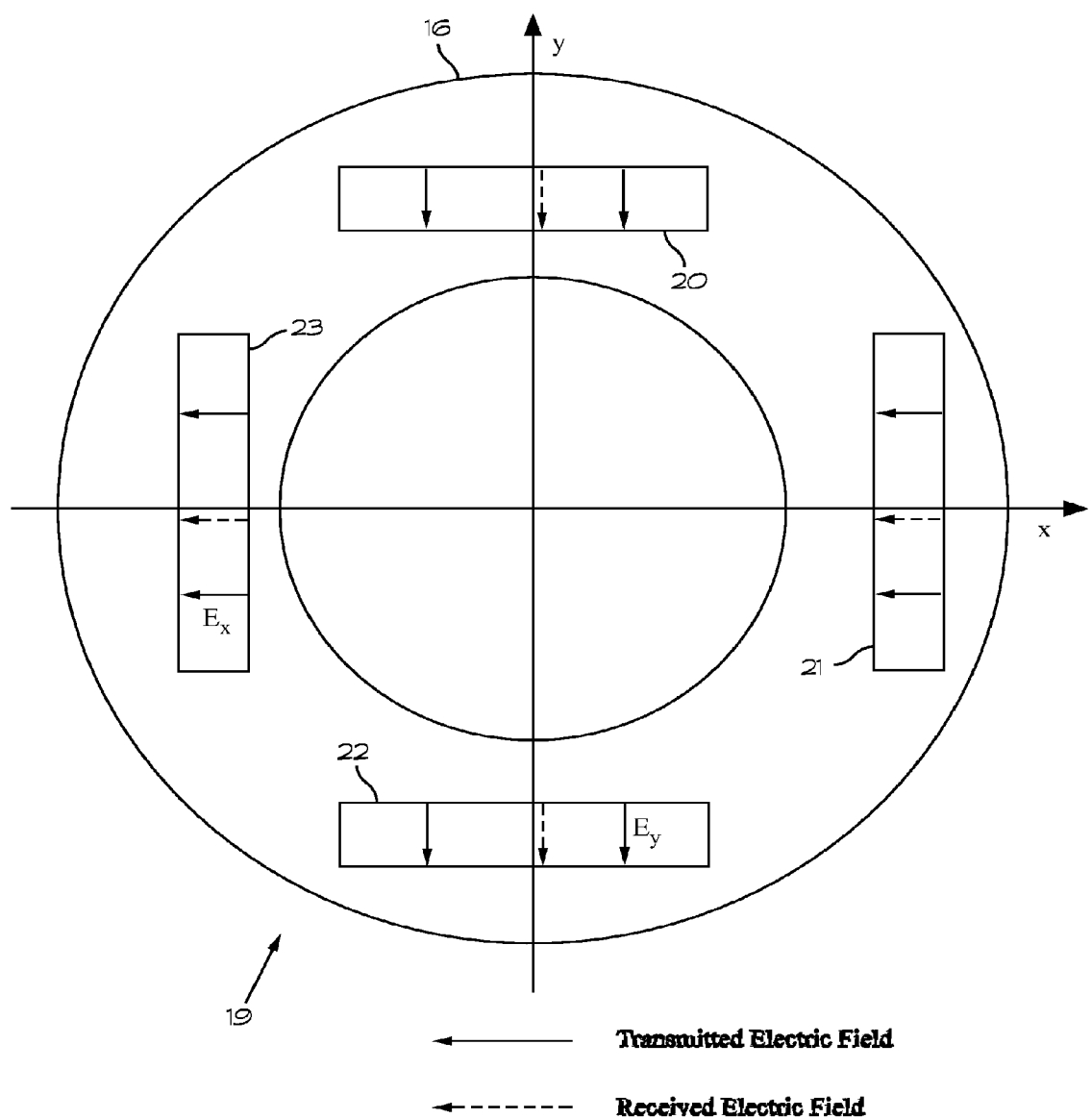
FIG. 3 illustrates four antenna elements embedded into the nose of a guided munition.

FIG. 3 shows a sensor 19 that includes four antenna elements 20-23 that are embedded in a nose section 26 of a guided munition 16. These antenna elements 20-23 are used to illuminate incoming targets when the RF emitter's signals are blocked from the guided projectile (seeker mode).

Referring again to FIG. 3, the antenna elements 20-23 are preferably aligned along two perpendicular axes (x, y) located in a plane normal to the lengthwise axis of the munition 16. The fields of each of the antenna elements 20-23 are set parallel to the axis where the antenna element is located. The antenna elements 20-23 are preferably equally spaced from the munition axis. The main beam of the sensor is aligned along the munition axis. The antenna elements 20 and 22 aligned on the x-axis are chosen to be active such that they both transmit and receive RF signals. The other two antenna elements 21 and 23 aligned on the y-axis are chosen to be passive such that they only receive.

Each two elements located on the same axis have the same orientation and the same phase center to ensure the equality of both magnitude, and direction of electric fields transmitted or received by each one of the two antenna elements. Taking only two antenna elements 20 and 22 to be active and the other two antenna elements 21 and 23 to be passive minimizes the coupling (interference) between the antenna elements and reduces power consumption. Having magnitudes and phases of both like and cross-polarized backscattered signals enables the extraction of the target (incoming munition) shape from both signals.

The like polarized field $E_y$ is the sum of the fields measured by the antenna elements 20 and 22. The cross-polarized field $E_x$ is the sum of the fields measured by the antenna elements 21 and 23. The sensor 19 also measures the phase difference Φ of like and cross-polarized fields.

Knowing the relationship between magnitude and phase difference of like and cross-polarized backscattered fields and the incident angle α and the distance L provides the capability of obtaining the orientation of the incoming munition. This relationship, which is known as inverse scattering, can be inferred through either an analytic approach or a neural network approach.

The analytic approach is based on:
Analysis of the database to infer the dependence of backscattered signals on the incident angle α and the distance L between the scattering center and the center of gravity for the incoming munition;
Capturing the dependence into mathematical formulae; and
Implementing the formulae into the payload of the sensor for future use.

The neural network approach is based on:
Using the database of in training a neural network for extracting the incident angle α and the distance L from the data; and
Implementing the trained network into the payload of the sensor for future use.

The operating frequency of a radio frequency polarized (RFP) sensor is determined by considering several factors such as size of the incoming munition, weather condition, weight requirements of the guided munition, etc. At lower frequencies (longer wavelength) different parts of an incoming munition contribute to the backscattered polarized signals. However, at lower frequencies the RFP sensor requires antennas with larger sizes and apertures, which may not fulfill the requirements of the guided munition.

At higher frequencies (shorter wavelengths) antennas with smaller sizes can be used. In this case backscattered signals stem from both munition parts perpendicular to the direction of the transmitted signals, and irregularities such as fins, canards, etc. (FIG. 2) located on the munition surface. Furthermore, the sensor signals are more attenuated by rain and ice particles, especially at millimeter wave frequencies.

The RFP sensor frequency typically is chosen to be around the X and Ku bands (8-18 GHz). These frequencies provide the following advantages:
Mitigating impacts of weather conditions such as rain, hail, snow etc.;
Minimizing contributions of small irregularities on incoming munitions surfaces to the sensor response; and
Avoiding the atmospheric absorption bands due to both oxygen (centered at 60 and 118 GHz) and water vapor absorption (centered at 22.235, 183 and 323).

In either case a database of backscattered polarized signals will be created and analyzed. The database is created at different configurations for both sensor and incoming munition. Creating the database is known as a direct scattering or forward scattering. In analyzing the data polarization transformation from the local frame of the incoming munition (target) to the local frame of either the guided munition or a ground station is required. A polarization transformation can be employed.

Figure 4:
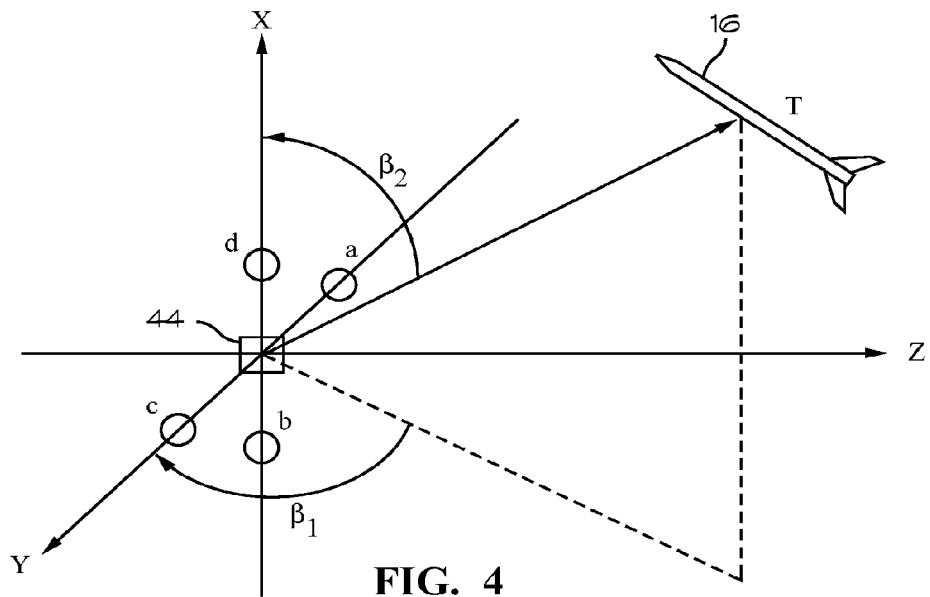
FIG. 4 illustrates a monopulse configuration for measuring direction of arrival of an incoming munition.
Figure 5:
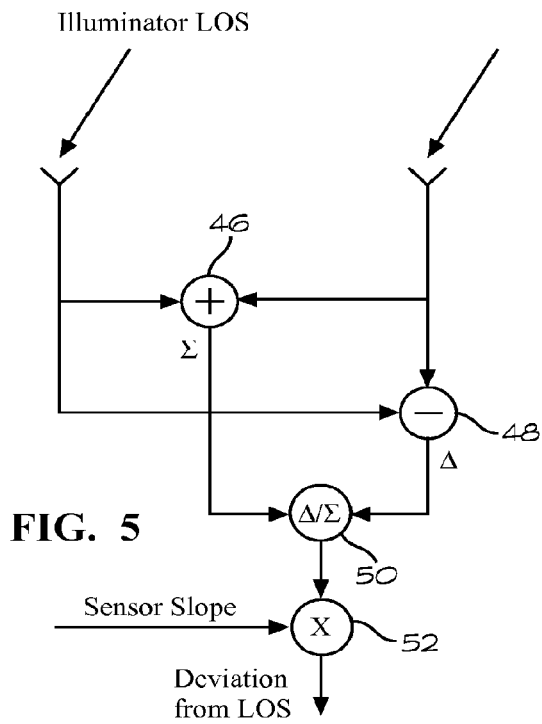
FIG. 5 is a block diagram showing a monopulse method for determining angular deviation of an incoming munition.

Referring to FIG. 4, the incoming munition 15 has two directions of arrival with respect to the boresight (main beam) of an RFP sensor 44 located at the origin of a coordinate system (X,Y,Z). These directions are the horizontal angle of arrival $\beta_1$, and vertical angle of arrival $\beta_2$ as shown in FIG. 4. A monopulse radar technique (FIG. 5) can be applied to extract the horizontal angle of arrival from the difference and sum of the voltages measured by the two antenna elements 20 and 22; and to extract the vertical angle of arrival from the voltage measured by the other two antenna elements 21 and 23. Signals from the munition 15 are input to a summing circuit 46 and to a differencing circuit 48. The output Δ of the differencing circuit 48 and the output Σ of the summing circuit 46 are input to a divider 50 that calculates the quotient $$\frac{\Delta}{\Sigma}$$

to produce a monopulse ratio. A multiplier 52 multiplies the monopulse ratio by a sensor slope factor to determine the angular deviation of the munition 16 from the RFP sensor's line of sight (LOS), and hence the axis of the guided munition 15.

To illustrate how the monopulse technique can be applied to obtain the horizontal direction of arrival let the voltage measured by the antenna element 21 to be $v_a$ and the voltage measured by the antenna element 22 to be $v_c$. The monopulse ratio $R_{ac}$ associated with the two antenna elements 20 and 22 is constructed as $$R_{ac} = \frac{v_a - v_c}{v_a + v_c}. \tag{1}$$

Getting values of the monopulse ratio using Equation (1) gives the capability to extract values of the azimuth direction of arrival $\beta_1$ such that $$\beta_1 = \kappa R_{ac} \tag{2}$$

In the above κ is a constant slope factor that depends on the antenna element geometry and the operating frequency.

The vertical direction of arrival is similarly obtained from the monopulse ratio between the difference and sum of the responses of the antenna elements 21 and 23 such that $$R_{bd} = \frac{v_b - v_d}{v_b + v_d} \quad (4)$$

and $$\beta_2 = \kappa R_{bd}. \quad (5)$$

The linear velocity vector of an incoming target may be extracted as follows:
  Measuring the Doppler frequency shift in the response of each antenna element 20-23;
  Getting the component of the linear velocity vector along the direction between each of the antenna elements and the incoming munition, which leads to three algebraic equations in the perpendicular components for the velocity vector;
  Solving the equations to obtain the magnitudes of the linear velocity components; and
  Calculating the magnitude and direction of the velocity vector from the velocity components.

The target velocities associated with each Doppler frequency shift are calculated and designated as $u_a$, $u_b$, $u_c$ and $u_d$. Also let the linear target velocity vector be $\overline{U}(U_x, U_y, U_z)$. In addition, the unit vectors along the directions connecting the antenna elements 20-23 and the scattering center of the incoming munition expressed as:

$$\hat{a} = a_x \hat{x} + a_y \hat{y} + a_z \hat{z} \quad (6)$$

$$\hat{b} = b_x \hat{x} + b_y \hat{y} + b_z \hat{z} \quad (7)$$

$$\hat{c} = c_x \hat{x} + c_y \hat{y} + c_z \hat{z} \quad (8)$$

$$\hat{d} = d_x \hat{x} + d_y \hat{y} + d_z \hat{z} \quad (9)$$

Taking the scalar vector products of Equations (6)-(9) with the velocity vector $\overline{U}$ yields the following set of four algebraic equations.

$$u_a = a_x U_x + a_y U_y + a_z U_z \quad (10)$$

$$u_b = b_x U_x + b_y U_y + b_z U_z \quad (11)$$

$$u_c = c_x U_x + c_y U_y + c_z U_z \quad (12)$$

$$u_d = d_x U_x + d_y U_y + d_z U_z \quad (13)$$

Three Equations (10)-(13) can be solved to obtain the components of target velocity vector $\overline{U}$. The fourth equation should be ignored because it is dependent on the other three equations.

In the presence of plural incoming munitions, a monopulse technique can be used. The technique has the capability of detecting the presence of two targets within a scan of the RFP sensor 44, and extracting direction of arrivals of each munition. The technique can be generalized under certain conditions to detect the presence of more than two incoming munitions and extracting direction of arrival of each munition.

Figure 7:
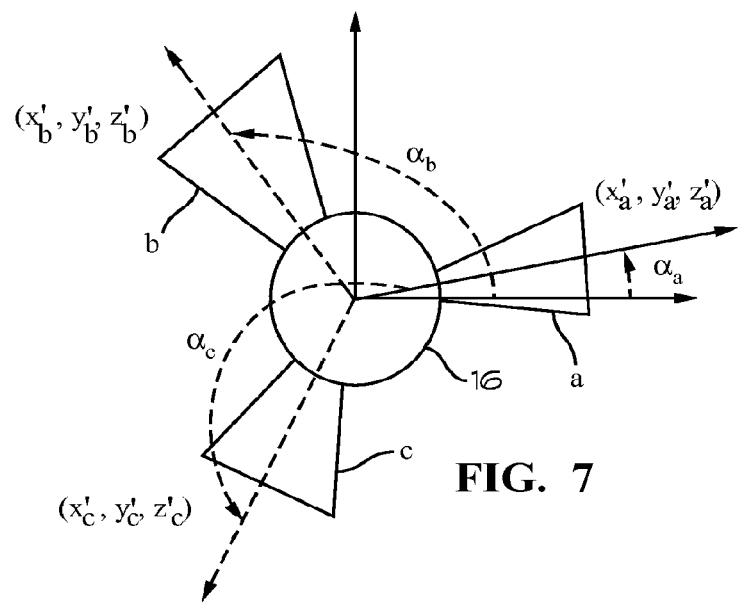
FIG. 7 coordinates of antennas mounted into the fines of a guided munition.
Figure 6:
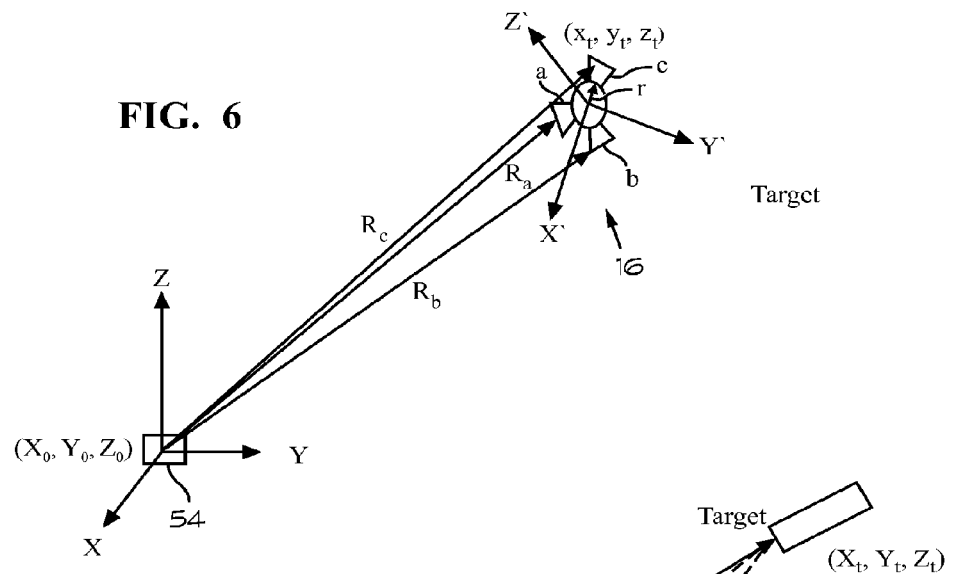
FIG. 6 graphically illustrates position vectors of a plurality of antennas embedded into the fins of a guided munition.

FIGS. 6 and 7 illustrate the basic concept of the invention using a single RF emitter 54 located at coordinates $(X_0, Y_0, Z_3)$ in an emitter reference frame $(X,Y,Z)$. The axis of symmetry of the guided munition 15 is located at $(x_t, y_t, z_t)$ in the emitter reference frame $(X,Y,Z)$. The vector from $(X_0, Y_0, Z_0)$ to $(x_t, y_t, z_t)$ is the target munition position vector. The guided munition local reference frame is $(X', Y', Z')$. The Z' axis is aligned through the axis of symmetry of the guided munition 15. The X' and Y' axes are in a plane perpendicular to the axis of symmetry.

The orientation angles (roll, yaw, pitch) relate the local frame of the target munition to the emitter reference frame. Three RF antennas a, b and c are located a distance r from the center of symmetry of the target munition. As shown in FIG. 6, the antennas are positioned at distances $R_a$, $R_b$ and $R_c$, respectively, from the RF emitter 54. Referring to FIG. 7, in the local frame of the guided munition the components of the position vector of the antenna a are
$(x'_a, y'_a, z'_a)$ $$x'_a = x'_t + r \cos \alpha_a \quad (14)$$

$$y'_a = y'_t + r \sin \alpha_a \quad (15)$$

$$z'_a = z'_t \quad (16)$$

The positions of the other two antenna b and c can be similarly expressed in the local frame of the guided munition.

Applying triangulation using the three antennas yields the position vector $(x'_t, y'_t, z'_t)$ of the target munition:

$$X'_0 - x'_t = \frac{1}{\Delta}[(\sin\alpha_c - \sin\alpha_b)(R_a^2 - R_b^2) + (\sin\alpha_c - \sin\alpha_b)(R_b^2 - R_c^2)] \quad (17)$$

$$Y'_0 - y'_t = \frac{1}{\Delta}[(\cos\alpha_c - \cos\alpha_b)(R_a^2 - R_b^2) + (\cos\alpha_c - \cos\alpha_b)(R_b^2 - R_c^2)] \quad (18)$$

$$(Z'_0 - z'_t)^2 = -[(X'_0 - x'_t)^2 + (Y'_0 - y'_t)^2 + r^2] + \quad (19)$$
$$\frac{2r}{1-\lambda}\{(X'_0 - x'_t)(\cos\alpha_a - \lambda\cos\alpha_b) + (Y'_0 - y'_t)(\sin\alpha_a - \lambda\sin\alpha_b)\}$$

where $$\Delta = 2r[(\cos\alpha_b - \cos\alpha_a) \quad (20)$$
$$(\sin\alpha_c - \sin\alpha_b) + + (\cos\alpha_c - \cos\alpha_b)(\sin\alpha_b - \sin\alpha_a)]$$

and $$\lambda = \left(\frac{R_a}{R_b}\right)^2. \quad (20)$$

Transferring the position vector $(x'_t, y'_t, z'_t)$ to the reference frame of the emitter 54 gives the required target munition position vector $(x_t, y_t, z_t)$.

The guided munition 16 has a velocity vector with the unknown velocity components $V_x$, $V_y$ and $V_z$ along the X, Y and Z axes of the emitter reference frame; and the antennas a, b and c measure the Doppler velocities $V_a$, $V_b$ and $V_c$ respectively. The Doppler velocities $V_a$, $V_b$ and $V_c$ are related to the velocity vector components $V_x$, $V_y$ and $V_z$ through the following identities:

$$V_a = \frac{1}{R_a}((x_a - X_0)V_x + (y_a - Y_0)V_y + (z_a - Z_0)V_z) \quad (21)$$

$$V_b = \frac{1}{R_b}((x_b - X_0)V_x + (y_b - Y_0)V_y + (z_b - Z_0)V_z) \quad (22)$$

$$V_c = \frac{1}{R_c}((x_c - X_0)V_x + (y_c - Y_0)V_y + (z_c - Z_0)V_z). \quad (23)$$

Figure 8:
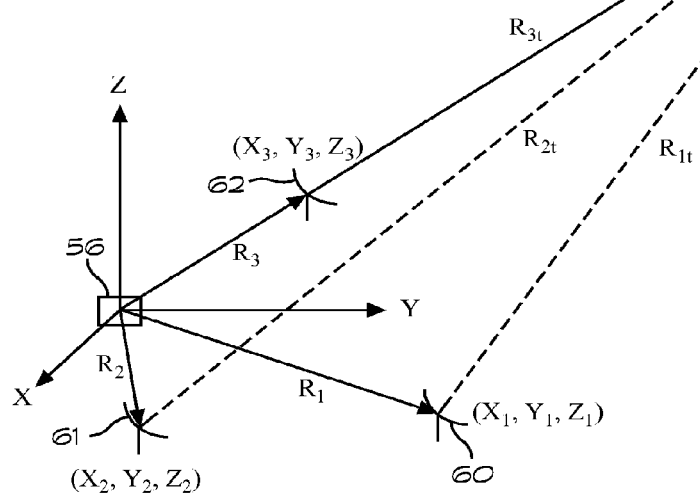
FIG. 8 graphically illustrates position vectors of a guided munition with respect to each of three RF emitters.

FIG. 8 illustrates a system 56 that uses three emitters 60-62 with three different frequencies for measuring position and velocity vectors of a guided projectile. The emitters 60-62 are located at coordinates $(X_1, Y_1, Z_1)$, $(X_2, Y_2, Z_2)$ and $(X_3, Y_3,$ $Z_3$), respectively. The system 56 records signal travel time between each of the emitters 60-62 and an RF antenna embedded in the projectile. A triangulation process is used to measure distances between each of the emitters 60-62 and the RF antenna to obtain the position vector of the projectile. The system 56 uses the measured Doppler frequency associated with each emitter and the derived position vector to obtain the velocity of the projectile. The signals from the three emitters 60-62 may also be used to obtain angular rotation rates. Each emitter signal has its own direction and polarization, which provide additional information for extracting angular rates.

The position vector components $(x_t, y_t, z_t)$ of the projectile in terms of components of the position vectors $R_i$'s (i=1, 2, 3) and the distance between the projectile and each of the emitters $R_{it}$'s (i=1, 2, 3) may be written as the following matrix equation:

$$\begin{bmatrix} (x_2 - x_1) & (y_2 - y_1) & (z_2 - z_1) \\ (x_3 - x_2) & (y_3 - y_2) & (z_3 - z_2) \\ (x_1 - x_3) & (y_1 - y_3) & (z_1 - z_3) \end{bmatrix} \begin{bmatrix} x_t \\ y_t \\ z_t \end{bmatrix} = \begin{bmatrix} (R_{1t}^2 - R_{2t}^2) - (R_1^2 - R_2^2) \\ (R_{2t}^2 - R_{3t}^2) - (R_2^2 - R_3^2) \\ (R_{3t}^2 - R_{1t}^2) - (R_3^2 - R_1^2) \end{bmatrix} \quad (24)$$

The matrix equation governing the components of the velocity vector $(v_x, v_y, v_z)$ is written in terms of the position vector components $(x_t, y_t, z_t)$, the distances $(R_{1t}, R_{2t}, R_{3t})$ between the emitters and the three velocity components $(v_{1d}, v_{2d}, v_{3d})$:

$$\begin{bmatrix} (x_t - X_1) & (y_t - Y_1) & (z_t - Z_1) \\ (x_t - X_2) & (y_t - Y_2) & (z_t - Z_2) \\ (x_t - X_3) & (y_t - Y_3) & (z_t - Z_3) \end{bmatrix} \begin{bmatrix} v_x \\ v_y \\ v_z \end{bmatrix} = \begin{bmatrix} R_1 v_{1d} \\ R_2 v_{2d} \\ R_3 v_{3d} \end{bmatrix} \quad (25)$$

Figure 9:
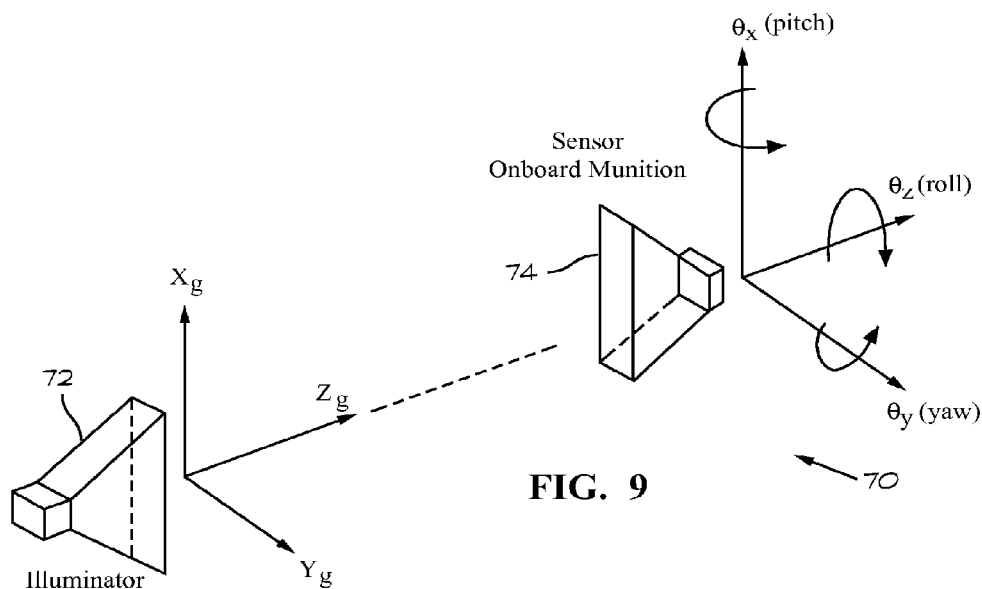
FIG. 9 illustrates a configuration of s single RF polarized sensor.

FIG. 9 illustrates a basic configuration for a single RF polarized sensor system 70 for measuring orientation angles of the guided projectile and their change rates (angular velocities). The sensor system 70 includes an active sensor 72 used as an illuminator/emitter and a passive sensor 74 that is understood to be embedded on the fins of a guided munition. For simplicity, two similar flared feed horn antennas are used as RF polarized sensors for both the active and passive sensors 72 and 74, respectively. The direction of the active illuminator antenna 72 is kept fixed. The direction of the passive munition antenna 74 is varied by varying its roll, yaw and pitch angles. The RF power received by the munition passive sensor antenna 74 is determined as a function of its angular rotations.

Figure 10:
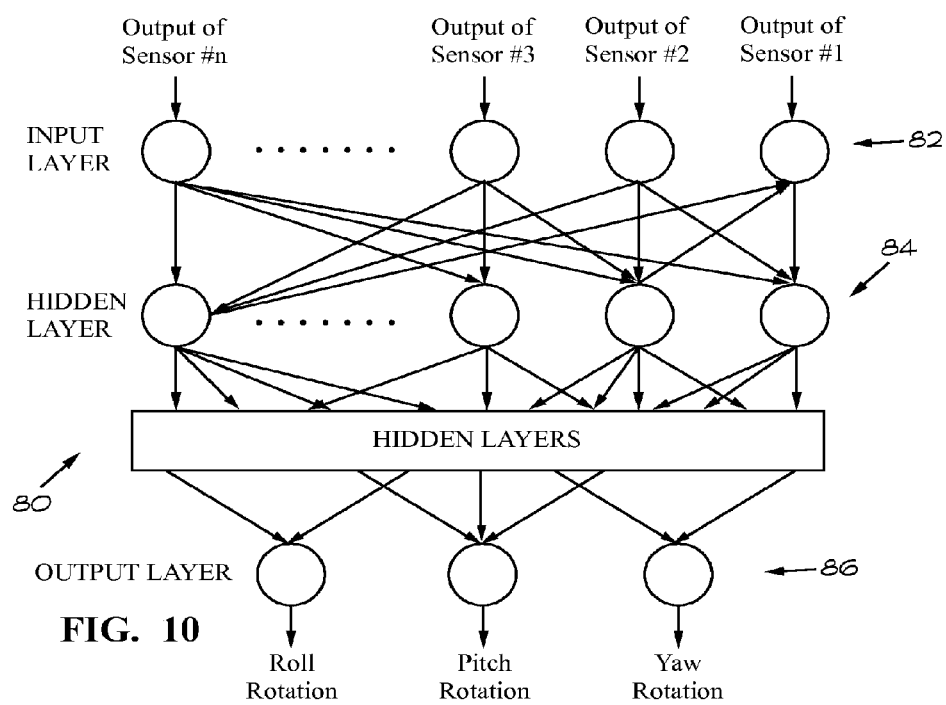
FIG. 10 schematically illustrates a neural network that may be used for determining angular rotations from measured RF polarized data.

Referring to FIG. 10, a neural network 80 may be used to extract values of angular rotation from measured RF polarized power. The neural network 80 includes an input layer 82 that receives measured RF polarized data output from a plurality of RF sensors. A plurality of hidden layers 84 contain neurons that calculate signals that are output at an output layer 86. Extracting angular rotations from measured RF polarization data is based on two steps. The first step is to train the neural network 80 on extracting angular rotation by using simulated or real data. The second step is to employ the trained network in extracting angular rotation from other measured RF polarized data. In training the neural network RF polarized data is obtained at different scenarios for sensors and munition configurations and for variations in the surrounding environment.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A sensor system for measuring parameters used for guiding a gun-launched projectile, comprising:
   a plurality of RF antennas mounted to the projectile, each RF antenna being arranged to receive an RF signal of a selected polarization; and
   a radar RF emitter/receiver system arranged to direct polarized RF signals toward the plurality of RF antennas mounted to the projectile, the radar RF emitter/receiver being further arranged to receive polarized RF signals backscattered from the plurality of RF antennas mounted to the projectile and process the received polarized backscattered RF signals to determine position and velocity vectors of the projectile.

2. The sensor system of claim 1 wherein the plurality of RF antennas includes:
   a first pair of antenna elements spaced apart symmetrically with respect to the projectile lengthwise axis along an axis x located in a plane normal to the lengthwise axis; and
   a second pair of antenna elements spaced apart symmetrically with respect to the projectile lengthwise axis along an axis y located in a plane normal to the lengthwise axis and perpendicular to the x-axis.

3. The sensor system of claim 2 wherein the first pair of antenna elements are active such that they function as both sending and receiving antennas, and the second pair of antennas are passive so that they function only as receiving antennas.

4. The sensor system of claim 3 wherein two antenna elements on the same axis have the same orientation and phase center to ensure the equality of both magnitude, and direction of electric fields transmitted or received by each one of the two antenna elements.

5. The sensor system of claim 4 wherein the antenna elements on the x-axis are cross-polarized and on the y-axis are like-polarized.

6. The sensor system of claim 1, comprising three emitters that emit signals with three different frequencies for measuring position and velocity vectors of the guided projectile, the three emitters are located at coordinates $(X_1, Y_1, Z_1)$, $(X_2, Y_2, Z_2)$ and $(X_3, Y_3, Z_3)$, the system being arranged to record signal travel time between each of the three emitters and a corresponding RF antenna embedded in the projectile, the system being further arranged to use a triangulation process to measure distances between each of the emitters and the corresponding RF antenna to obtain the position vector of the projectile, the system being further arranged to use the measured Doppler frequency associated with each emitter and the derived position vector to obtain the velocity vector of the projectile, the signals from the three emitters each having its own direction and polarization, which provide additional information for extracting angular rate of the projectile.

7. The sensor system of claim 1, further comprising a neural network arranged to extract values of angular rotation from measured RF polarized power, the neural network including an input layer that receives measured RF polarized data output from a plurality of RF sensors, a plurality of hidden layers arranged to contain neurons that calculate signals that indicate rotation, and an output layer that outputs roll, pitch and yaw signals.

8. A method for measuring parameters used for guiding a gun-launched projectile, comprising the steps of:
mounting a plurality of RF antennas to the fins of the projectile;
arranging each RF antenna to receive an RF signal of a selected polarization; and
arranging a radar RF emitter/receiver system to direct polarized RF signals toward the plurality of RF antennas; and
arranging the radar RF emitter/receiver to receive polarized RF signals received by the plurality of RF antennas mounted on the projectile and process the received polarized RF signals to determine position and velocity vectors for the gun-launched projectile.

9. The method of claim 8 further including the steps of:
spacing a first pair of antenna elements apart symmetrically with respect to the projectile lengthwise axis along an axis x located in a plane normal to the lengthwise axis; and
spacing a second pair of antenna elements apart symmetrically with respect to the projectile lengthwise axis along an axis y located in a plane normal to the lengthwise axis and perpendicular to the x-axis.

10. The method of claim 9 further including the steps of:
forming the first pair of antenna elements to be active such that they function as both sending and receiving antennas; and
forming the second pair of antennas to be passive so that they function only as receiving antennas.

11. The method of claim 10 further including the step of arranging the antenna elements such that two antenna elements on the same axis have same orientation and phase center to ensure the equality of both magnitude, and direction of electric fields transmitted or received by each one of the two antenna elements.

12. The method of claim 11 further including the step of arranging the antenna elements such that the antenna elements on the x-axis are like-polarized and the y-axis are cross-polarized.

13. The method of claim 8 further including the steps of:
arranging three emitters to emit signals with three different frequencies for measuring position and velocity vectors of the projectile's fins;
placing the three emitters at coordinates $(X_1,Y_1,Z_1)$, $(X_2,Y_2,Z_2)$ and $(X_3,Y_3,Z_3)$;
recording signal travel time between each of the three emitters and a corresponding RF antenna embedded in the projectile;
using a triangulation process to measure distances between each of the emitters and the corresponding RF antenna to obtain the position vector of the projectile;
measuring Doppler frequency associated with each emitter and the derived position vector to obtain the velocity of the projectile; and
arranging the signals from the three emitters so that each has its own direction and polarization to provide additional information for extracting angular rate of the projectile.

14. The method of claim 8 further including the steps of:
arranging a neural network to extract values of angular rotation from measured RF polarized power; and
forming the neural network to include an input layer that receives measured RF polarized data output from a plurality of RF sensors, a plurality of hidden layers arranged to contain neurons that calculate signals that indicate rotation, and an output layer that outputs roll, pitch and yaw signals.

* * * * *